United States Patent [19]

Bradstreet et al.

[11] 4,172,513
[45] Oct. 30, 1979

[54] ARTICLE HANDLING APPARATUS USING AIR FLOW TO PROVIDE ARTICLE ORIENTATION

[75] Inventors: Richard W. Bradstreet, Webster; Willard J. Barlow, LeRoy, both of N.Y.

[73] Assignee: Eastman Kodak Company, Rochester, N.Y.

[21] Appl. No.: 882,515

[22] Filed: Mar. 1, 1978

[51] Int. Cl.² ............................................. B65G 47/24
[52] U.S. Cl. ................................... 198/380; 198/400; 414/755
[58] Field of Search ............... 198/380, 399, 400, 493; 193/48; 214/1 BE, 1 Q; 221/156, 157; 271/185, 186, 65; 302/2 R; 209/644

[56] References Cited

U.S. PATENT DOCUMENTS

| 3,622,151 | 11/1971 | Range | 198/380 |
| 3,734,268 | 5/1973 | Burger et al. | 198/380 |

Primary Examiner—Robert B. Reeves
Assistant Examiner—Douglas D. Watts
Attorney, Agent, or Firm—S. W. Gremban

[57] ABSTRACT

Apparatus is disclosed for classifying or orienting articles having surface areas which differ in the characteristic usually referred to as "smoothness" or "roughness". An air stream is directed against the articles to impinge against one of the surface areas. The apparatus is configured so that if the impinged area is smooth, a laminar flow condition will be established which draws the article towards the air stream. If the impinged area is rough, on the other hand, the article will be blown outwardly from the air stream. One embodiment has particular utility with flat articles having opposed surfaces, one of which is relatively smooth and the other of which is rough (being interrupted by ribs or like discontinuities). The articles are transported leaning against a flat support member so that a random one of the respective opposed surfaces will move across an air stream which is expelled from a hole in the support member. If the air stream impinges upon the smooth surface, a laminar flow condition is established and the article is drawn toward the wall and remains in its original orientation. If the air stream impinges upon the rough surface, however, laminar air flow does not occur and the article is blown over away from the support member.

19 Claims, 12 Drawing Figures

ARTICLE HANDLING APPARATUS USING AIR FLOW TO PROVIDE ARTICLE ORIENTATION

BACKGROUND OF THE INVENTION

1. Field of the Invention

The present invention relates generally to article handling apparatus and, more particularly, to such apparatus employing an air stream for orienting or classifying articles having surface areas which differ significantly in continuity or roughness.

2. Description of the Prior Art

It is known in the art to use air pressure in various types of article handling apparatus. In some cases a pressure differential is used to actuate solenoids, pistons, valves and the like. In others, an air stream interacts directly with the article to affect its position or condition. For example, U.S. Pat. No. 3,734,268 discloses an assembly for orienting lids having a cupped rim or skirt. An air nozzle directs a stream of air against the lid to flip "skirt-down" articles to a "skirt-up" position, without disorienting articles already in the "skirt-up" position. In this case the lids have the characteristic configuration of the cupped rim or skirt, and the air nozzle can be positioned to direct an air stream to contact an outer portion of the skirt to induce a flipping action thereto. When the article is already in the skirt-up position, on the other hand, the air stream acts upon a lesser area, resulting in only a slight lifting action which is not sufficient to flip the skirt-up article. Such apparatus is apparently suitable for orienting lids and similar articles having the required surface configuration, but it is not suitable for a number of other articles of different configurations, such as flat elements, with which the present invention has particular utility. As another example, U.S. Pat. No. 3,307,678 discloses bobbin handling apparatus for orienting bobbins which have a characteristic configuration of one open end being larger than the other end. The bobbins are uniformly oriented by providing a pair of air nozzles which produce air streams cooperating to flip improperly oriented bobbins to the desired orientation. The air stream takes advantage of the characteristic configuration of the bobbin and, like the lid orienting apparatus discussed above, the disclosed bobbin handling apparatus would appear to be limited to handling and orienting objects of a particular configuration.

SUMMARY OF THE INVENTION

In accordance with the present invention, as distinguished from the above-discussed prior art, articles are classified or oriented not according to shapes but, rather, by certain surface characteristics. The present invention makes practical use of a scientific curosity known as "the disc paradox" which is related to Bernoulli's principle. The present invention recognizes that a stream of air directed at a flat surface produces a different air flow than when the air stream is directed at a rough surface and that, under certain conditions described more fully below, this difference in air flow can be used to advantage in the handling and orienting of certain types of articles.

In accordance with the present invention, apparatus is provided for classifying or orienting articles having surface areas which differ in the characteristic usually referred to as "smoothness" or "roughness". An air stream is so directed against a surface of the articles that a vacuum effect results if the surface area is smooth. If the surface area is rough, on the other hand, a pressure is asserted on the article by the air stream tending to move the article away from the stream. In a presently preferred embodiment of the invention, apparatus is provided for handling and orienting generally flat articles wherein each article has a relatively smooth surface on one face and a rough surface on a second face opposed to the first face. Means are provided for transporting the articles standing on one edge while leaning against a flat support member. The transported articles advance past an air discharge opening in the support member which directs an air stream against the facing surface of the articles. If the air stream "sees" the rough surface facing the support member, it will blow the article over, rotating it away from the support member about the edge on which the article is standing. If the air stream "sees" the smooth surface facing the support member, a vacuum effect is produced which draws the article toward the support member in its original orientation.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because various types of article handling apparatus are known in the art, the present invention will be directed to elements forming part of or cooperating more directly with apparatus in accordance with the present invention. Those specific elements of article handling apparatus not shown or described should be understood to be selectable from those known in the art.

Article handling apparatus perform various functions such as transporting, sorting or orienting articles. The sorting and orienting of articles is particularly necessary in those applications wherein it is desired to automate an assembly process. Designing appropriate apparatus for sorting or orienting articles is, in general, a difficult task because it is necessary to provide mechanical apparatus capable of recognizing the different article types and orientations. Such apparatus generally takes advantage of some characteristic configuration of the article to be handled, such as skirts on lids (U.S. Pat. No. 3,734,268) or a bobbin shape (U.S. Pat. No. 3,307,678), as discussed above. As a result, apparatus designed for use with one type of article generally is not suitable for handling, sorting or orienting other article configurations.

Figure 1A:
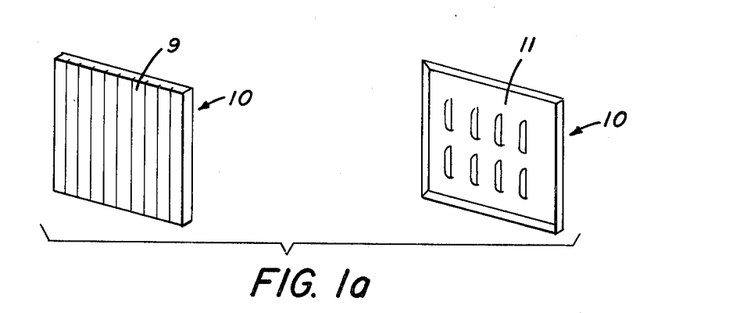
FIGS. 1a, 1b and 1c show examples of articles having surface characteristics useful in practicing the present invention.
Figure 1B:
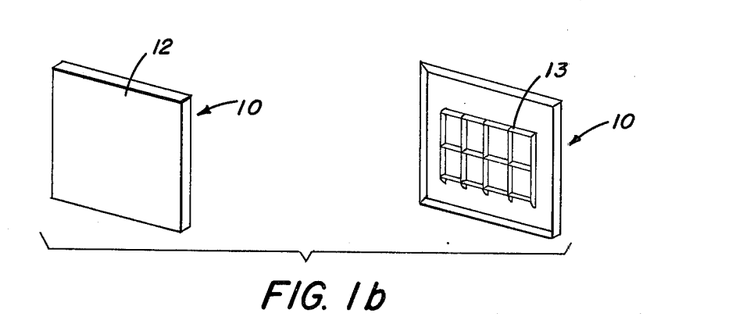
Figure 1C:
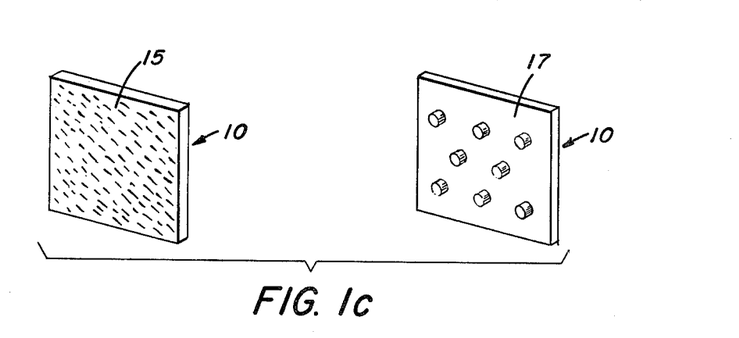
Figure 2:
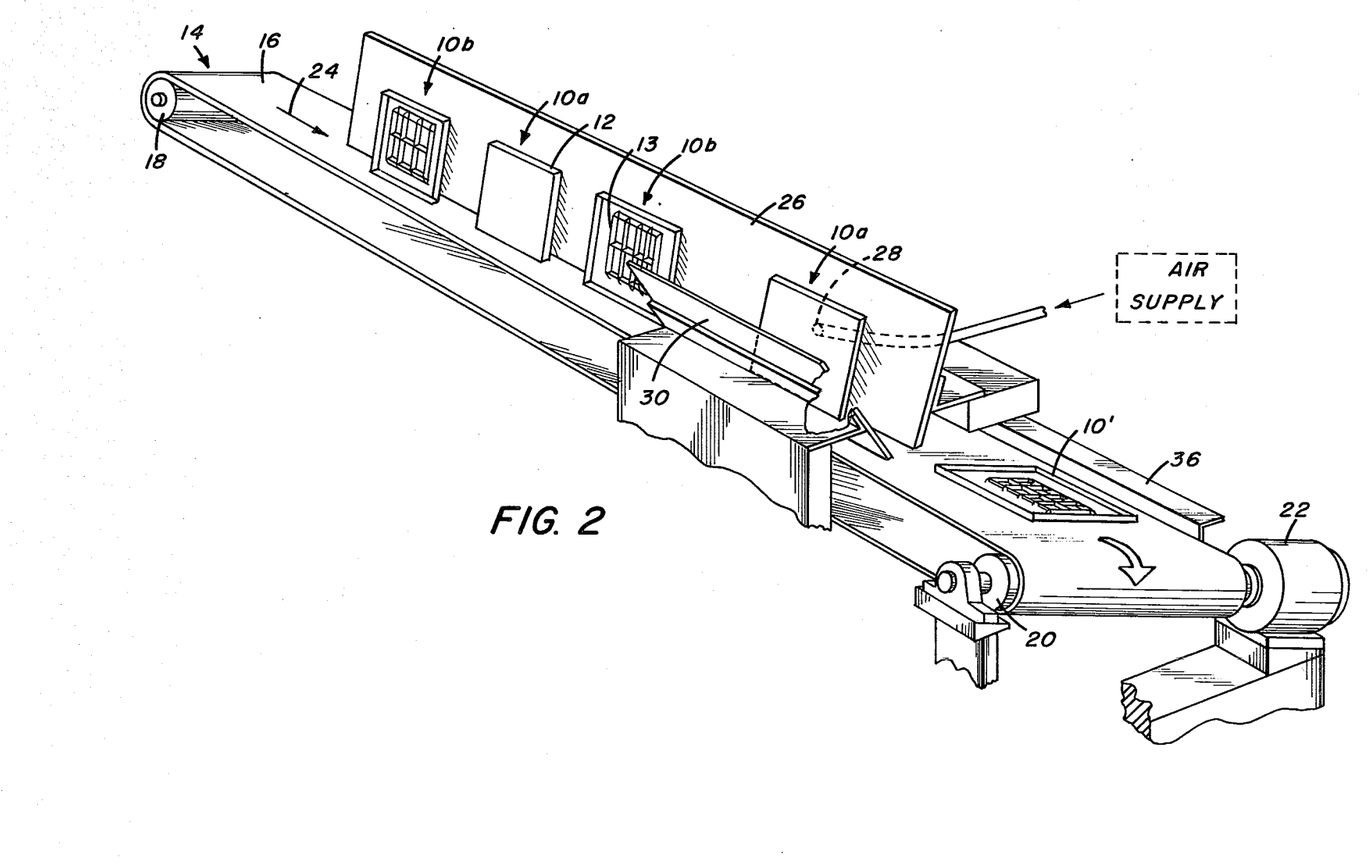
FIG. 2 is a perspective view of article handling apparatus in accordance with the present invention, depicting a conveyor, article supporting member and an air stream device.

FIG. 2 shows article handling apparatus in accordance with one embodiment of the present invention for use in handling articles generally of the type shown in FIGS. 1a, b and c. Each of the articles has a rough surface 11, 13 or 17 and a smooth surface 9, 12 or 15 respectively. It will be noted that the smooth surfaces are not perfectly smooth and the rough surfaces are of various types. The meaning of the terms rough and smooth is made more definite below. The rough surface of the article 10 which is shown in FIG. 2 is formed of a series of ridges 13; however, it will be apparent to those skilled in the art that the rough surface can be formed in many other ways as well, for example see FIGS. 1a and 1c.

In general, the article handling apparatus shown in FIG. 2 receives articles 10 in random orientation and outputs the articles 10 according to a uniform, predetermined orientation. Means are provided for transporting the articles 10 in the form of a conveyor 14 comprising a conveyor belt 16 guided by a pair of guide rollers 18 and 20, the guide roller 20 being driven by a motor 22. The conveyor belt 16 is inclined at an angle to a horizontal plane P (FIGS. 3 and 4) to cause the articles 10 to lean against a wall or support member in the form of a primary dead plate 26 during transportation. As shown in FIG. 2, some of the articles 10 are oriented with their smooth surface 12 toward the primary dead plate 26 (e.g., article 10b), while other articles are oriented with their rough surface 13 toward the primary dead plate 26 (e.g., article 10a). Regardless of the initial orientation, the articles are outputted having a uniform orientation which is indicated by the article 10'. Since all of the articles 10 emerge uniformly oriented, subsequent handling and assembly of such articles is greatly facilitated.

Orientation of the articles 10 is achieved by using a single air jet to blow articles away from the primary dead plate 26 or to draw the articles toward the primary dead plate 26, depending upon the initial article orientation. In particular, a nozzle 28 is provided in the primary dead plate 26 and is connected to a source of air under pressure. The nozzle 28 may be formed by a hole or aperture in the dead plate 26 or by a separate component which is mounted in an opening of the dead plate 26. The air under pressure passing through the nozzle 28 produces an air flow directed away from the dead plate 26. As an article having the orientation of the article 10a passes over the nozzle 28, the air stream impinges upon the rough surface 13 and blows the article 10a away from the primary dead plate 26 and against a second support member in the form of a secondary dead plate 30. The article 10a thus continues to be transported by the conveyor 14 with its smooth surface 12 leaning against the secondary dead plate 30. As the article 10a leaves the secondary dead plate 30 it drops onto the conveyor belt 16 in the orientation shown by article 10'. In contrast, as an article having the orientation of article 10b passes in front of the nozzle 28, the emerging air flow causes the article 10b to be sucked or drawn against the primary dead plate 26, in a manner more fully described below. The article 10b thus continues to be transported by the conveyor 14 with its smooth surface 12 leaning against the primary dead plate 26. As the article 10b is transported past the primary dead plate 26, it also drops onto the conveyor belt 16 with the orientation as shown by article 10'. The result therefore is that all articles, regardless of their initial orientation, end up on the conveyor belt 16 with the same orientation.

Figure 3:
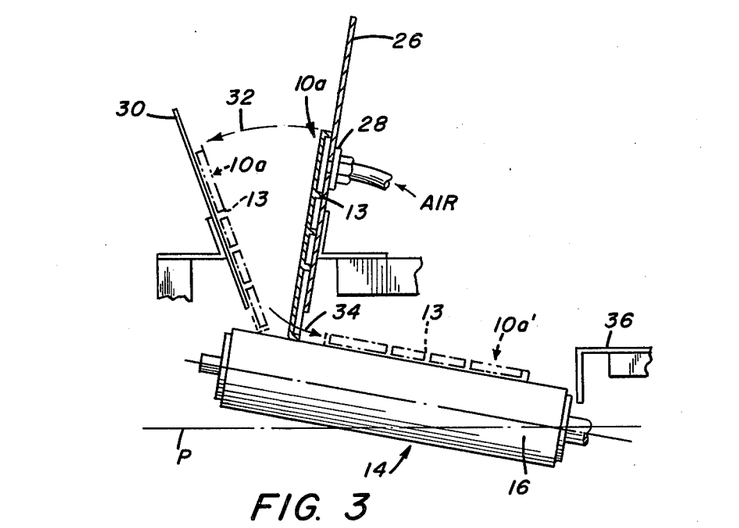
FIGS. 3 and 4 are front elevational views of the apparatus shown in FIG. 2.
Figure 4:
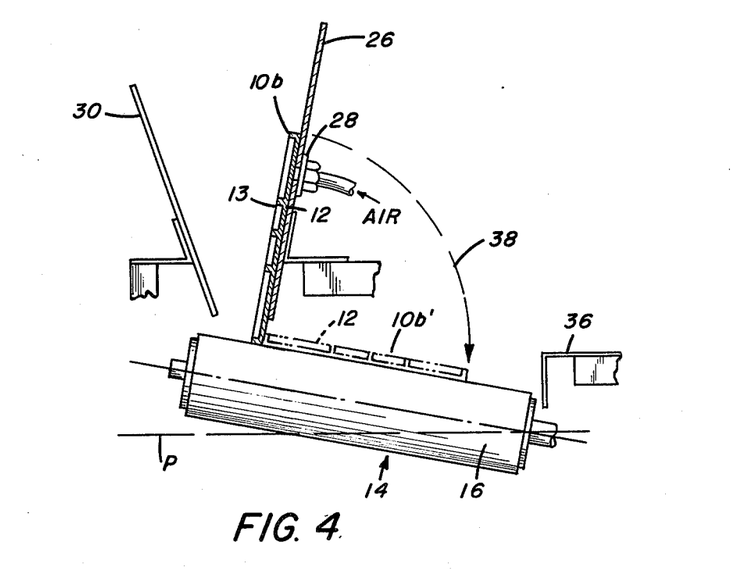

The actual orientation process may be described more clearly with reference to FIGS. 3 and 4. As shown in FIG. 3, the article 10a is leaning on the primary dead plate 26 with its ribbed surface 13 facing the dead plate 26. As the article 10a passes over the nozzle 28, which is shown as mounted flush and perpendicular to the dead plate 26, the air flow emerging from the nozzle 28 causes the article 10a to be blown over in the direction of arrow 32 against the secondary dead plate 30. Because of the inclination of the conveyor 14 and the secondary dead plate 30, the article 10a slides off the dead plate 30 in the direction shown by arrow 34 to the position indicated by 10a'. Ultimately, the article 10a may come to rest against a retaining member 36 and be transported to a subsequent work station. Thus, an article 10a having its ribbed surface 13 originally against the primary dead plate 26 will end up on the conveyor belt 16 with the ribbed surface 13 up.

Referring to FIG. 4, now consider article 10b which is transported by the conveyor 14 and leans against the primary dead plate 26 with its smooth surface 12 toward the dead plate 26. In this orientation, as the article 10b passes over the nozzle 28 a vacuum is created between the smooth surface 12 of the article 10b and dead plate 26. (This "vacuum effect" is discussed more fully below.) Unlike the article 10a, therefore, the article 10b is not blown over against the secondary dead plate 30 but, rather, is sucked down against the primary dead plate 26. As the article 10b is transported by the primary dead plate 26 it drops in the direction indicated by arrow 38 onto the conveyor belt 16, now assuming the position shown by article 10b'. As with the article 10a, the article 10b ultimately comes to rest against the retaining member 36 and is transported to a subsequent work station. The significant factor is that the article 10b, like the article 10a, ends up on the conveyor belt 16 with its ribbed surface 13 facing up, even though the articles were originally of opposite orientation.

Figure 5:
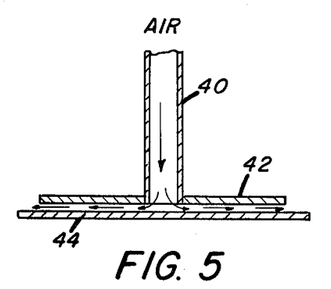
FIGS. 5, 6 and 7 are schematic views depicting the physical phenomenon on which the present invention is based.
Figure 6:
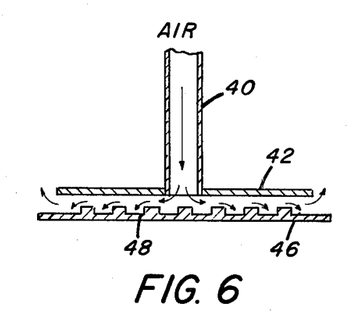

It is seen from the discussion above that the same air flow either acts to blow articles over or to draw them towards the dead plate, depending upon whether a rough or a smooth surface faces the air flow respectively. This effect is believed to be related to an example of Bernoulli's principle generally known as the disc paradox (for example, see *General Physics*, by William S. Franklin and Barry MacNutt, page 96). Shown in FIG. 5 is a tube section 40 connected to a support member in the form of flat disc 42. As air under pressure is applied to the tube 40, a flat plate 44, surprisingly, is not blown away from the member 42 but, rather, is drawn quite strongly against the member 42 because of the low pressure created by the rapidly moving air flow between the two discs 42 and 44. If, on the other hand, the flat disc 44 is replaced by a disc 46 as shown in FIG. 6 which has a rough surface 48, no vacuum action will be produced. This result is believed to occur because a vacuum effect is only produced when there is laminar air flow between the two discs 42 and 44. The rough or discontinuous surface 48 breaks up this laminar air flow and destroys the Bernoulli condition.

Figure 7:
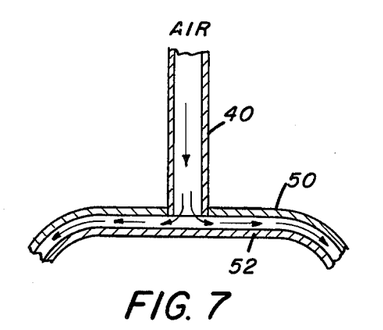

The disc paradox is not limited to articles which have generally planar surfaces. As an example, FIG. 7 shows the tube 40 connected to a support member 50 having a curvilinear contour. Spaced from the support member 50 is an article 52 of generally matching, or complementary, curvilinear contour. As air under pressure is applied to the tube 40, a liminar air flow is created between the member 50 and the article 52 which gives rise to a vacuum action which causes the article 52 to be drawn down against the support member 50. The important condition is that the contours of the smooth surface of the article and the support member be complementary. It is also important that article 52 be relatively smooth in order to permit laminar air flow to be obtained.

At this point it is appropriate to consider in more detail what is meant by the terms rough and smooth as applied to the surfaces of the article 10. It will be apparent from the discussion above that a rough surface is a surface having a configuration, or texture, which breaks up the laminar air flow between the rough surface and the corresponding support member to such an extent that a vacuum action is not created; in fact, the opposite effect occurs, i.e., the article is blown away from the support member by the air flow. A smooth surface, on the other hand, is a surface which is sufficiently smooth so that the laminar air flow between the article and the support member is not sufficiently disturbed to cause the article to be urged away from the support member. It should be noted that the definition of a smooth surface is not limited to a surface so smooth as to give rise to a vacuum effect. All that is actually necessary is that the surface be smooth enough to permit sufficient laminar air flow such that the article is not urged away from the support member. Referring back to FIG. 2, it is now seen that the inclination of the conveyor 14 serves two functions. The first function is to permit the articles 10 to lean under the influence of gravity with one surface against the primary dead plate 26 while being transported by the conveyor belt 16. A second function is to enable the apparatus shown in FIG. 2 to be operative when used with articles having a "smooth" surface which is not sufficiently smooth to produce a significant vacuum effect, or any vacuum effect at all. Thus, even though the smooth surface of an article tends to break up, to some extent, the laminar air flow produced between the primary dead plate 26 and the articles 10, and therefore the air flow emerging from the nozzle 28 exerts a slight pressure upon the article 10, the article 10 is not blown over against the secondary dead plate 30 because the force of gravity acts against the article 10 to maintain the article 10 leaning against the primary dead plate 26. When the rough surface of an article 10 passes in front of an air stream, however, a much greater outward force is exerted against the article 10 and is sufficient to blow the article 10 over onto the secondary dead plate 30. In this case, the outward force exerted by the air stream on the article 10 is greater in magnitude than the force of gravity which tends to hold the article 10 against the primary dead plate 26. It is thus seen that the angle of inclination of the conveyor 14 can be adjusted to compensate for a range of smooth or rough surface types.

There are certain other parameters which may also be adjusted depending upon the particular configuration of the article 10 to be handled. For example, it has been found through experimentation that the article handling apparatus shown in FIG. 2 will operate successfully with a range of air pressures and nozzle sizes. The precise range of air pressures and nozzle sizes which are operative are found to depend to some extent upon the particular geometry and surface properties of the article which is being handled. For the article 10 shown in FIG. 2 having a ribbed surface 13 wherein the ribs extend about ⅛ of an inch from the article surface, and having a smooth surface 12 which is relatively flat, it has been found that the air pressure applied to the nozzle 28 may vary between about 5 and 15 pounds per square inch, while the nozzle size may vary between about 0.01 to 0.10 inches. It will be apparent to those of ordinary skill in the art that these parameters are interrelated. For example, one may be able to compensate for larger nozzle apertures by increasing the air pressure or by redesigning the ribbed configuration 13 to "catch" more air. Likewise, a low air pressure may be compensated for by decreasing the size of the nozzle aperture. In any event, given a particular geometry and configuration of an article 10 to be handled, it is a simple matter to experiment with a range of air pressures, nozzle sizes, and conveyor inclinations to determine an operable range of system parameters.

Figure 8:
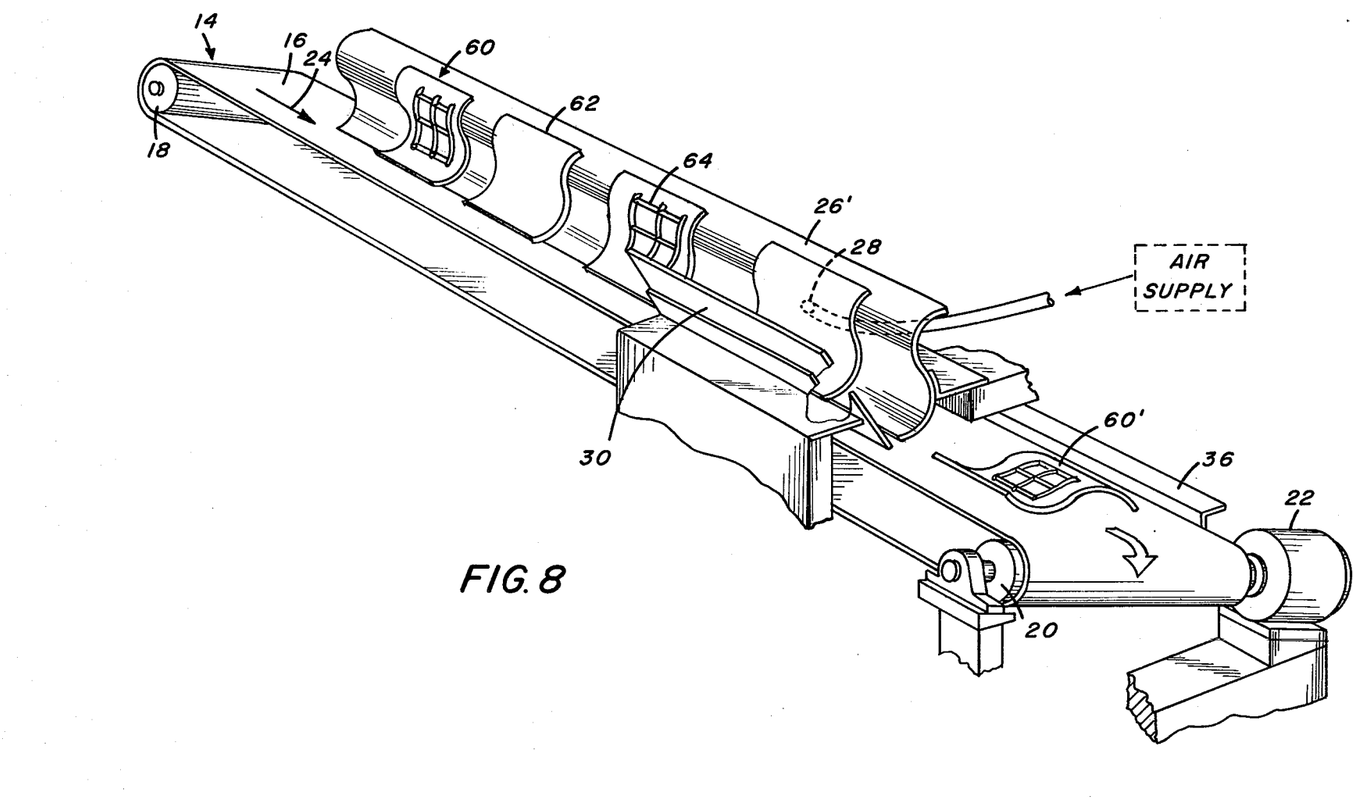
FIG. 8 is a perspective view of article handling apparatus in accordance with a second embodiment of the invention.
Figure 9:
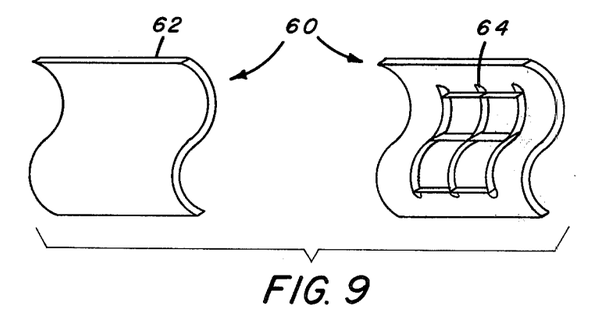
FIG. 9 depicts articles in a configuration suitable for use with the apparatus as depicted in FIG. 8.

FIG. 8 shows another embodiment of the present invention for handling articles which have surfaces which are not generally planar. An example of such an article is shown in FIG. 9 wherein it is seen that the article has a curvilinear, cross section. The article 60 has a smooth surface 62 and a rough surface 64. The apparatus of FIG. 8 resembles that of FIG. 2 except that the primary dead plate 26, now enumerated 26', has been redesigned to have a surface contour complimentary to the surface contour of the article 60, i.e., both are "S" shaped in cross section. Apart from this difference, the embodiment of the invention shown in FIG. 8 operates similarly to the apparatus disclosed in FIG. 2. The description of such operation need not be repeated. It will be noted that it is only necessary to redesign the primary dead plate 26' and not the secondary dead plate 30. This is because, as discussed in connection with the disc paradox and FIG. 7, the dead plate should provide a surface which is complementary, or matching, in contour to the surface of the article to be handled. It is not necessary that the two surfaces exactly conform in contour, but only that the surfaces be sufficiently matched so as not to destroy the laminar air flow therebetween. As long as laminar air flow is established, the Bernoulli principle will apply and the faster moving air between the two surfaces will create a partial vacuum between the dead plate 26' and the article 60, causing the article 60 to be sucked towards the dead plate 26'. An article 60 which passes by the nozzle 28 with an orientation such that its rough surface 64 faces the dead plate 26' will, as before, be blown over against the secondary dead plate 30. On the other hand, if the smooth surface 62 faces the dead plate 26', the article 60 is drawn toward the dead plate 26'. The end result is that all articles 60, regardless of their original orientation, end up on the conveyor belt 16 in the orientation of article 60'.

Figure 10:
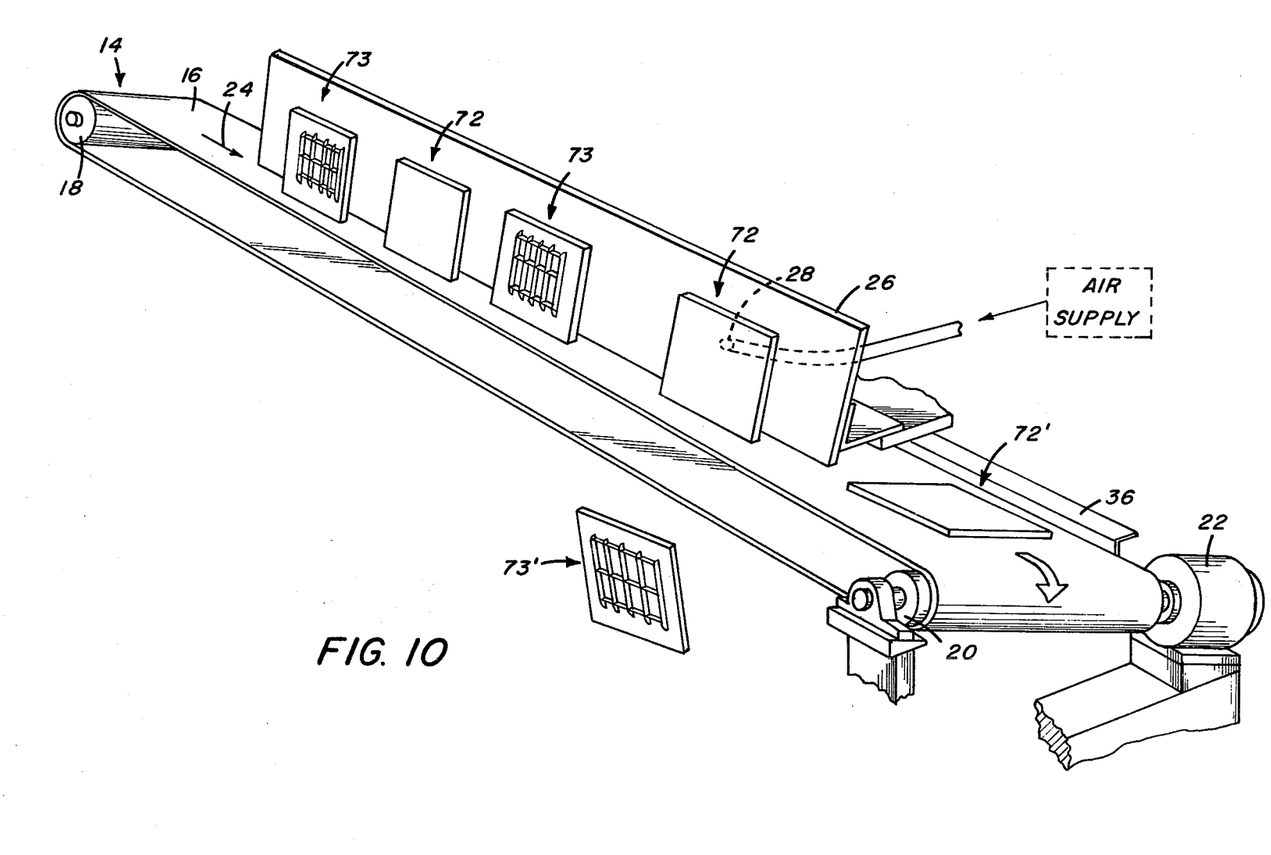
FIG. 10 is a perspective view of a third embodiment in accordance with the present invention, for separating or classifying articles of different surface types.

Referring to FIG. 10, apparatus is shown in accordance with the present invention for use in separating, rather than orienting, articles of different types. The articles shown in FIG. 10 are of two different types. The articles 72 have two smooth surfaces while the articles 73 have two rough surfaces. As the articles are transported by the conveyor 14 past the air flow from the nozzle 28, the articles 72 (which always have a smooth surface facing the air flow) are not blown away from the dead plate 26 but, rather, continue to be transported past the dead plate 26 and fall onto the conveyor in the position indicated by article 72'. The articles 73, which have only rough surfaces, pass the nozzle 28 and are blown away from the dead plate 26 by the air flow. The articles 73 fall off of the conveyor 14, as indicated by article 73′, and into a collection bin (not shown). The two different types of articles 72 and 73 are therefore separated according to their surface types, i.e., articles 72 continue to be advanced by the conveyor 14 (see article 72′), while the articles 73 are blown off of the conveyor 14 and into a collection bin (see article 73′).

The invention has been described in detail with particular reference to preferred embodiments thereof, but it will be understood that variations and modifications can be effected from the spirit and scope of the invention.

What is claimed is:

1. Apparatus for use with a source of air under pressure for handling articles, each article having a smooth surface and a rough surface, said apparatus comprising:
    means for transporting the articles along a predetermined path;
    a member positioned to be engaged by one of the surfaces of each article during transportation by said transporting means and having an air discharge aperture, said aperture having an area between 0.01 and 0.10 square inches; and
    means for supplying air under pressure from the source to said aperture at a pressure between 5 and 15 pounds per square inch to produce an air flow through said aperture (1) to cause those articles having a rough surface facing the air flow to be urged away from said member, and (2) to create laminar air flow between said member and a smooth surface so that those articles having a smooth surface facing the air flow will remain in engagement with said member.

2. Apparatus as claimed in claim 1 wherein said laminar air flow creates a reduced air pressure between said member and the smooth surface of the article which tends to urge the article toward said member.

3. Apparatus as claimed in claim 1 wherein said smooth surface is generally planar, said member has a generally planar portion, and said air discharge aperture is located in said generally planar portion of said member.

4. Apparatus as claimed in claim 3 wherein said air flow is directed from said aperture in a direction generally perpendicular to said generally planar portion of said member.

5. Apparatus as claimed in claim 1 wherein the smooth surface of each article has a defined contour, and said member includes a surface engaged by either the smooth or rough surface of the articles, the surface of the member having a contour generally complementary to the contour of the smooth surface of the articles, and said air discharge aperture is in said contoured surface of said support member.

6. Apparatus as claimed in claim 5 wherein the defined contour and said complementary surface contour are each S-shaped.

7. Apparatus for use with a source of air under pressure for handling articles, each article having a smooth surface and a rough surface, said apparatus comprising:
    means for transporting the articles along a predetermined path;
    a first support member along said path against which each article leans under the influence of gravity with one of its surfaces facing said support member during transportation by said transporting means;
    means defining an air discharge aperture in said first support member;
    a second support member along said path; and
    means for supplying air under pressure from the source to said aperture for producing an air flow through said aperture in said first support member to cause those articles having a rough surface facing said first support member to be blown over against said second support member, and to cause those articles having a smooth surface facing said first support member to remain in proximity to said first support member.

8. Apparatus as claimed in claim 7 wherein said smooth surface is generally planar, said first support member has a generally planar portion, and said discharge aperture is located in said generally planar portion of said first support member.

9. Apparatus as claimed in claim 7 wherein said aperture has an area between 0.01 and 0.10 square inches, and said air supply means supplies air to said aperture under pressure having a range between 5 and 15 pounds per square inch.

10. Apparatus as claimed in claim 7 wherein said transporting means lies in a plane, and said first support member is inclined at an angle substantially perpendicular to the plane of said transporting means.

11. Apparatus as claimed in claim 7 wherein said transporting means comprises a conveyor belt upon which articles are transported, and said first support member is inclined at an angle substantially perpendicular to said conveyor belt.

12. Apparatus as claimed in claim 7 wherein the smooth surface is of a defined contour, and said first support member includes a portion having a surface contour generally complementary to the contour of the smooth surface of the articles, and said air discharge aperture is in said contoured portion of said first support member.

13. Apparatus as claimed in claim 12 wherein said defined contour and said complementary surface contour are each S-shaped.

14. Apparatus for use with a source of air under pressure for handling articles, each article having a smooth surface and a rough surface, said apparatus comprising:
    a conveyor belt inclined at an angle relative to the horizontal for transporting the articles along a predetermined path;
    a member positioned to be engaged by one of the surfaces of each article during transportation by said transporting means and having an air discharge aperture, said member having a surface positioned substantially perpendicular to said conveyor belt such that either the smooth or rough surface of each article engages said surface of said member, under the influence of gravity, during transportion by said conveyor; and
    means for supplying air under pressure from the source to said aperture to produce an air flow through said aperture (1) to cause those articles having a rough surface facing the air flow to be urged away from said member, and (2) to create laminar air flow between said member and a smooth surface so that those articles having a smooth surface facing the air flow will remain in engagement with said member.

15. Apparatus as claimed in claim 14 wherein said laminar air flow creates a reduced air pressure between said member and the smooth surface of the article which tends to urge the article toward said member.

16. Apparatus as claimed in claim 14 wherein said smooth surface is generally planar, said member has a generally planar portion, and said air discharge aperture is located in said generally planar portion of said member.

17. Apparatus as claimed in claim 16 wherein said air flow is directed from said aperture in a direction generally perpendicular to said generally planar portion of said member.

18. Apparatus as claimed in claim 14 wherein the smooth surface of each article has a defined contour, and said member includes a surface engaged by either the smooth or rough surface of the articles, the surface of the member having a contour generally complementary to the contour of the smooth surface of the articles, and said air discharge aperture is in said contoured surface of said support member.

19. Apparatus as claimed in claim 18 wherein the defined contour and said complementary surface contour are each S-shaped.

* * * * *